(No Model.) 2 Sheets—Sheet 1.

J. B. QUIGGLE.
COFFEE MILL.

No. 490,163. Patented Jan. 17, 1893.

Witnesses
L. S. Elliott
E. W. Johnson

J. B. Quiggle.
Inventor
by [signature]
Attorney (No Model.) 2 Sheets—Sheet 2.

J. B. QUIGGLE.
COFFEE MILL.

No. 490,163. Patented Jan. 17, 1893.

Witnesses
L. S. Elliott
E. M. Johnson

J. B. Quiggle.
Inventor
by [signature]
Attorney

UNITED STATES PATENT OFFICE.

JAMES BURTON QUIGGLE, OF McELHATTAN, PENNSYLVANIA.

COFFEE-MILL.

SPECIFICATION forming part of Letters Patent No. 490,163, dated January 17, 1893.

Application filed May 14, 1892. Serial No. 433,030. (No model.)

*To all whom it may concern:*

Be it known that I, JAMES BURTON QUIGGLE, a citizen of the United States of America, residing at McElhattan, in the county of Clinton and State of Pennsylvania, have invented certain new and useful Improvements in Coffee-Mills; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in coffee mills.

The object of the invention is to provide a simple and efficient coffee mill for grinding grains of coffee; and it consists in providing a coffee mill composed of an upper receptacle in which the coffee is placed prior to being ground, said receptacle being supported by the main frame beneath which is a support having a drawer for the reception of the ground coffee, the device and grinding mechanism being constructed as will be hereinafter fully set forth.

Figure 1:
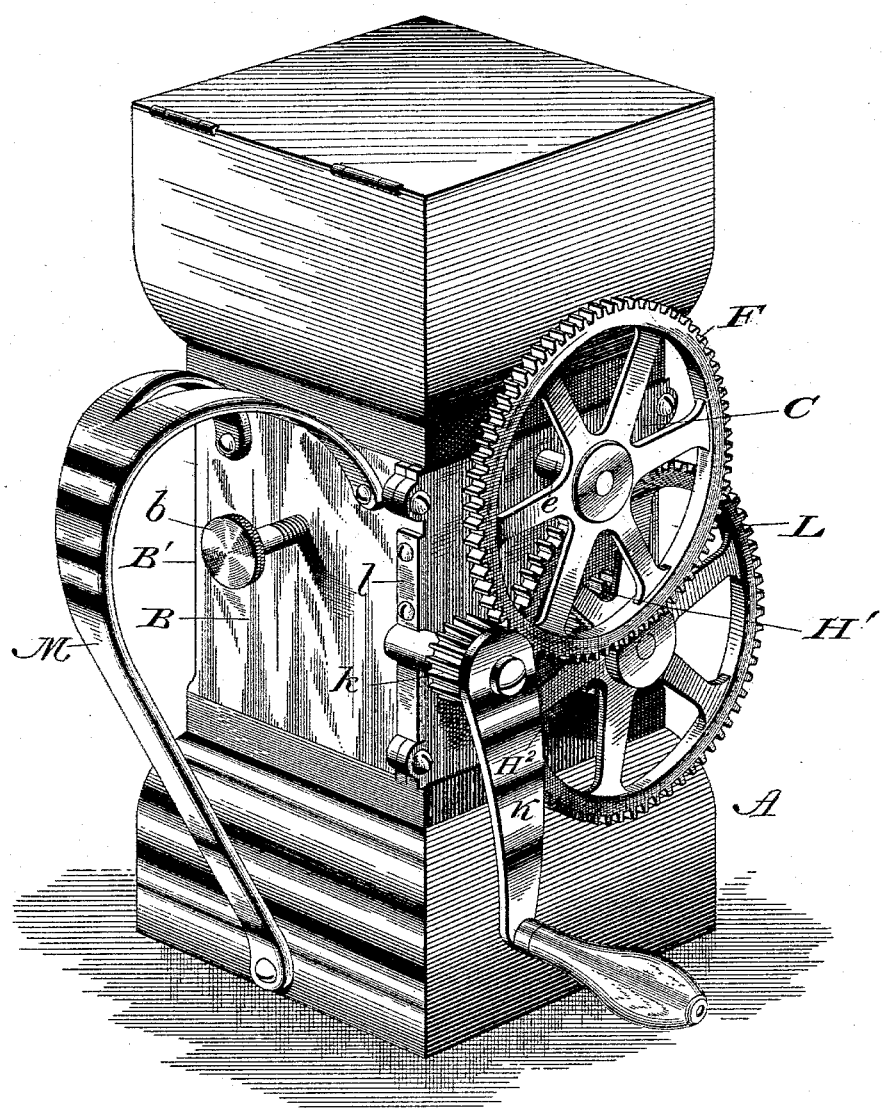
Figure 2:
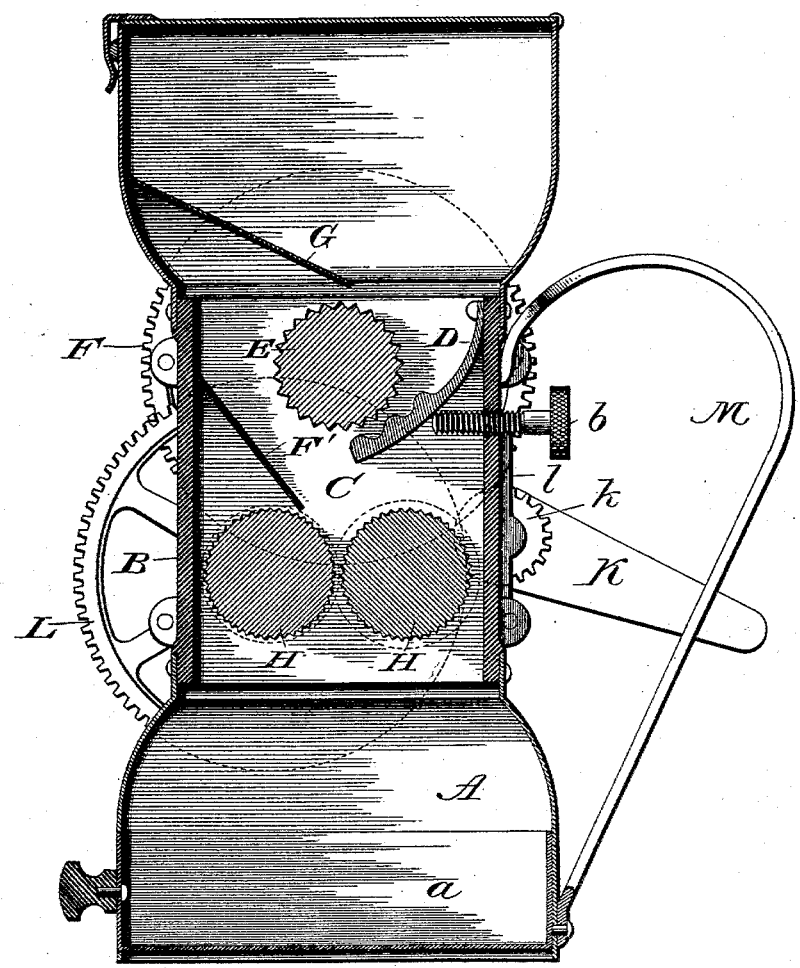

In the accompanying drawings forming part of this specification: Figure 1 is a perspective view. Fig. 2 is a vertical sectional view.

A designates the base or supporting frame of the mill, which is provided on one side with an aperture to receive a drawer $a$ into which the coffee falls after being ground.

B designates the body portion of the mill, which is preferably a casting having three sides to the open side of which is attached a plate C having apertured ears which register with apertured ears on the casting and through which bolts pass for connecting the parts. The plate C and opposite side B' of the body portion are provided with suitable apertures forming bearings for the shafts of the grinding rolls, said shafts being extended to receive gear-wheels, as will be hereinafter set forth. Within this frame and to one side of the same is located a concave D, which is pivoted and can be adjusted to and from the cylinder E by means of a set screw $b$ which passes through a threaded aperture in the rear wall of the frame. The cylinder E is essentially a crushing roll, the corrugations thereon being much coarser than the corrugations on the pair of rolls arranged beneath the same, and the shaft $e$ of this crushing roll is extended to a greater length than the shafts of the other rolls, so as to receive a gearwheel F of comparatively large diameter. To one side of the crushing roll and extending beneath the same is secured a deflecting plate F', which leads the crushed coffee to the grinding rolls the concave D besides performing its usual function also serving as a guide or deflector on the opposite side. The upper part of the mill, which is provided with a hinged cover, carries a deflecting plate G which will feed the coffee between the concave and crushing roll.

H H designate the grinding rolls, which are provided with ribs or projections on their surfaces, the shafts upon which they are mounted having gearwheels H' and H² of different diameters. These grinding rolls are placed comparatively close together and rotate at different speeds; much better results being attained by so gearing the parts than by having them rotate in unison.

K designates a crank handle, which is rigidly attached to or formed integral with a pinion $k$, through which passes a stub-shaft carried by a block $l$ attached to the section B of the mill, and this pinion meshes with the gearwheels F and L, said gearwheels being of the same diameter and having the same number of teeth.

M designates a handle which is attached at its upper end to the section B and at its lower end to the base A.

The upper and lower portions of the coffee mill are preferably made of sheet metal and have rectangular portions which abut against flanges formed on the upper and lower edges of the central section, the walls of which are cast-metal, and these flanges are suitably apertured for the reception of screws connecting the parts permanently to each other.

In operation, coffee is placed in the upper portion of the mill, or hopper, and is fed between the crushing roll and concave and falls therefrom on the grinding rolls, said grinding rolls rotating at different speeds and toward each other will grind the crushed coffee to the required degree of fineness. By means of the device hereinbefore described the coffee can be rapidly ground with a minimum amount of labor.

In a coffee mill made up of the parts as set forth I combine lightness and strength. The central casing which receives the greatest strain is made up of cast metal of such a thickness that by being simply apertured bearings for the shafts are provided; the upper portion or hopper and the base are both of sheet metal, as no great strain comes upon these parts, and the base is braced in the direction of the greatest strain by the handle, which is secured thereto and to the central casing. The whole construction has in view to provide a neat, effective and portable coffee mill for domestic use.

I am aware that prior to my invention it has been proposed to provide a coffee mill with a pair of feed rollers located above a grinding roll having an adjustable concave; also that it is not broadly new to provide a machine for crushing corn upon the cob with a rotary feed knife beneath which are located crushing rolls; and that cotton seed hullers have been provided with a roller having an adjustable concave; and that it is also old to provide coffee mills with a hopper grinding mechanism and a drawer beneath the same; but such mills as far as I am aware use conical crushers.

Having thus described my invention, what I claim as new, and desire to secure by Letters-Patent, is:

1. As an improved article of manufacture, a portable coffee mill made up of a hollow cast metal central section inclosing crushing and grinding mechanism, said section having apertures to provide bearings for the concave, screw for adjusting said concave and for the grinding rolls, the upper and lower portions of the casing having flanges against which bear a hopper and a base; a handle attached to the central section and to the base, gear-wheels F and L which mesh with a pinion on the shaft which carries the crank handle, and pinions carried by the shafts of the crushing rolls, the handle and crank handle projecting at right angles with each other, the parts being organized substantially as shown, and for the purpose set forth.

2. In a portable coffee mill, a central section having bearings for crushing and grinding rolls and gearing therefor as shown, a block having a stub shaft attached to one corner of said section, a crank handle carrying a pinion mounted on said stub-shaft, and gearwheels F and L mounted on the projecting ends of the crushing and grinding rolls, said gearwheels meshing with the pinion attached to the crank handle, and a hopper and base attached to the central section, substantially as shown, and for the purpose set forth.

3. In a portable coffee mill, the combination of the cast metal central casing, corrugated crushing and feed rolls centrally located within said casing, a concave pivoted to said casing, grinding rolls located beneath the same and geared to each other so as to rotate at different rates of speed, and gearing consisting of a cogwheel mounted on the shaft of the crushing roll, a cogwheel on the shaft of one of the grinding rolls, one of said wheels overlapping the other, a broad-faced driving pinion meshing with the aforesaid cogwheels, and pinions mounted on the shafts of the crushing rolls, substantially as shown, and for the purpose set forth.

In testimony whereof I affix my signature in presence of two witnesses.

J. BURTON QUIGGLE.

Witnesses:
  JNO. F. WAGNER,
  WILLIAM H. REASOR.